(12) United States Patent
Korpi et al.

(10) Patent No.: US 7,060,178 B2
(45) Date of Patent: Jun. 13, 2006

(54) UNIVERSAL SINGLE ELEMENT FILTER TEST FIXTURE

(75) Inventors: John Korpi, Livonia, MI (US); Michael Manceor, Troy, MI (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 336 days.

(21) Appl. No.: 10/460,815

(22) Filed: Jun. 13, 2003

(65) Prior Publication Data

US 2004/0251183 A1    Dec. 16, 2004

(51) Int. Cl.
B01D 35/00    (2006.01)
B01D 35/14    (2006.01)

(52) U.S. Cl. .................. 210/95; 210/232; 210/237; 210/295

(58) Field of Classification Search ...................... None
See application file for complete search history.

(56) References Cited

U.S. PATENT DOCUMENTS

| | | | | |
|---|---|---|---|---|
| 4,272,368 A | * | 6/1981 | Foord et al. | 210/90 |
| 5,685,974 A | * | 11/1997 | Fleming | 210/95 |
| 6,770,196 B1 | * | 8/2004 | Wall | 210/238 |

* cited by examiner

*Primary Examiner*—W. L. Walker
*Assistant Examiner*—Yoon-Young Kim
(74) *Attorney, Agent, or Firm*—David L. Kuhn; Luis Miguel Acosta; Thomas W. Saur

(57) ABSTRACT

A filter-testing fixture holds a single fuel filter and is adjustable to accommodate a range of filter sizes and shapes. The fixture has a base section that defines a water collection reservoir, and the base opens upward toward a housing. Water separated from fuel in the housing thus drains into the reservoir. A fuel inlet conduit passes through the reservoir, one end of the conduit being disposed above the base section. The first, or filter-supporting, adapter is removably attached to this end of the conduit, and both the first adapter and this end are disposed within, the housing. The housing removably and sealingly mates to the base, and a cap assembly likewise removably and sealingly mates to the housing. A second, repositionable, filter-holding adapter is connected to the inner surface of the cap.

5 Claims, 4 Drawing Sheets

UNIVERSAL SINGLE ELEMENT FILTER TEST FIXTURE

GOVERNMENT USE

The invention described here may be made, used and licensed by the or for the U.S. Government for governmental purposes without paying me any royalty.

BACKGROUND

An important consideration for military organizations that use large quantities of diesel fuel is the expense of filtering the fuel. This expense is influenced by the cost and life of the filter elements used for large scale filtering operations. Thus, it is often desirable to periodically try various kinds of filters to determine which offers the best value. One potential problem in doing his is that a filtration system may accommodate only one or only a few filter configurations. Additionally, it is desirable to avoid wholesale replacement of all filters in a system in order to test a different type of filter.

SUMMARY

The invention is a filter test fixture that addresses the aforementioned difficulties. The test fixture uses one filter at a time, and it adapts to a range of filter sizes and shapes, so that it provides an economical means of testing filters. The test fixture allows easy replacement of filters, even when the new filter has a different shape from the old. This is accomplished in part by the fixture's having a base, housing and cap that are easily removed from one another. Additionally, the fixture has easily accessible adapters that can be repositioned or replaced to accept varied shapes of filters. The test fixture has a further advantageous design feature that prevents damage to itself and prevents its accidental opening if tipped. Finally, the test fixture is relatively small and portable, and it can be used as a filtering station in remote locations.

BRIEF DESCRIPTION OF THE DRAWINGS

FIG. 2 shows the disposition of handles of fasteners, which secure the fixture's cap to the fixture's housing.

DETAILED DESCRIPTION

Figure 1:
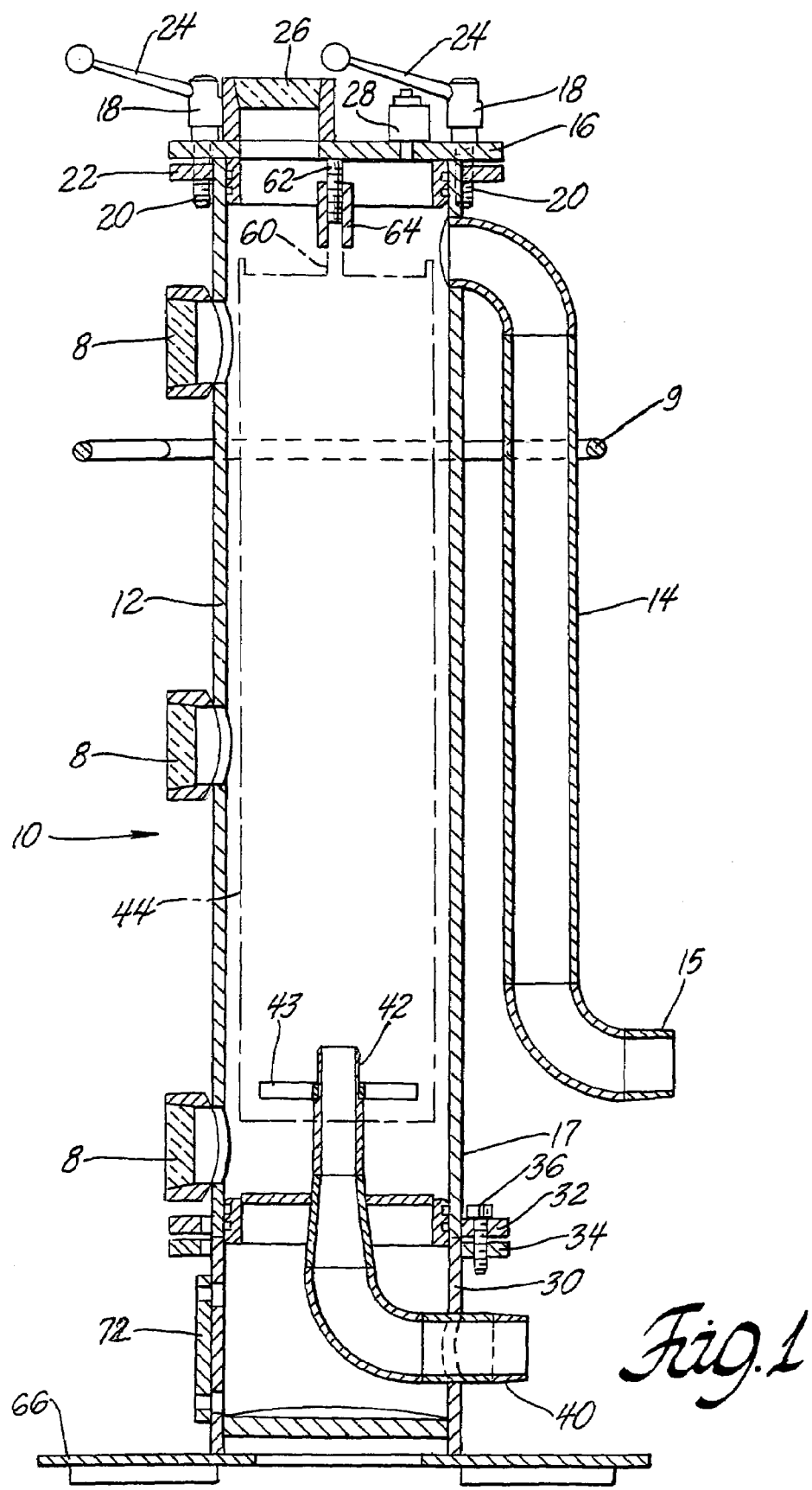
FIG. 1 is a sectional view of the test fixture for single-element fuel filters.

FIG. 1 shows the overall configuration of test fixture 10 for fuel filters when the fixture's components are assembled. The fixture contains a conventional filter 44 shown in phantom in FIG. 1, and the fixture has a generally upright cylindrical filter housing section 12 open at its lower end 17. An elongate, generally S-shaped conduit or pipe 14 is attached at the top of section 12, is disposed therealong, and has an exit end 15 near the section's lower end 17. On the opposite side of housing section 12 from the pipe is a set of lateral sight glasses 8, which are used to observe the fluid in the housing. Fastened about the upper region of housing-12 is a ring handle 9 having about the same diameter as a base plate 66 on which fixture 10 rests.

Figure 2:
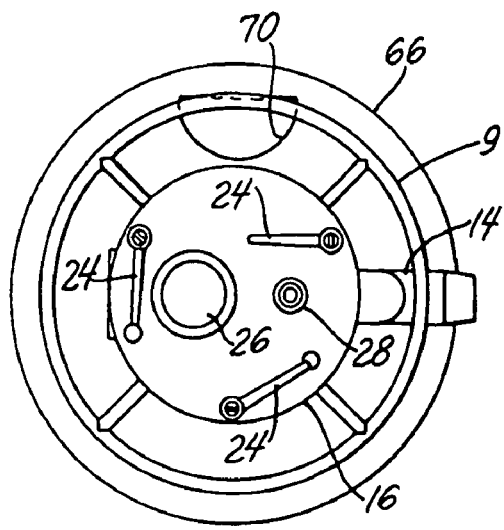
FIG. 2 is a plan view of the fixture shown in FIG. 1, with many of the hidden lines omitted for the sake of clarity.
Figure 4:
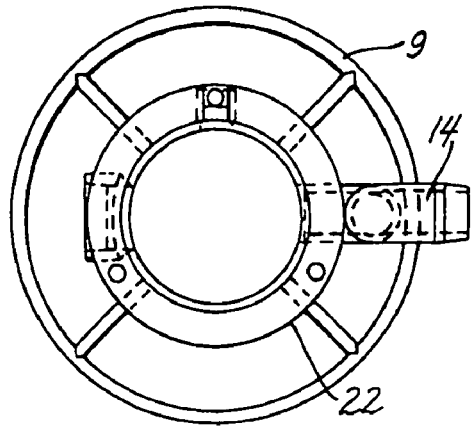
FIG. 4 is a plan view of the housing shown in FIG. 3.
Figure 3:
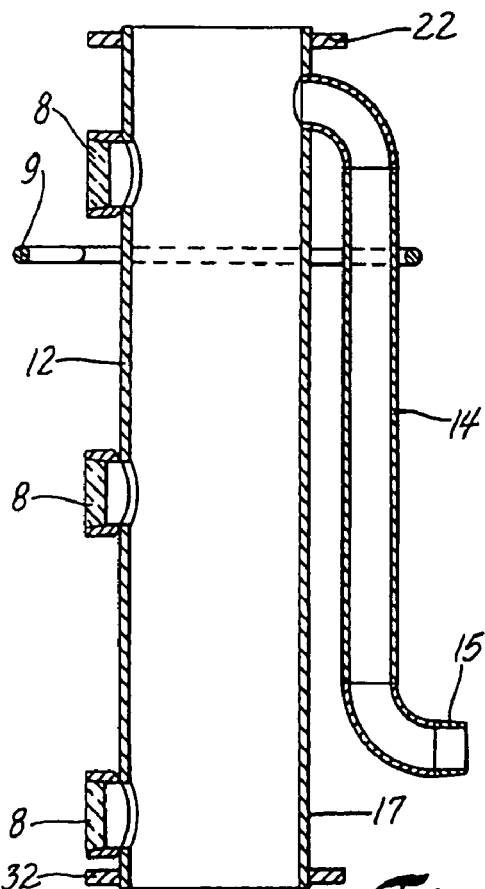
FIG. 3 is a sectional view of the housing alone.
Figure 5:
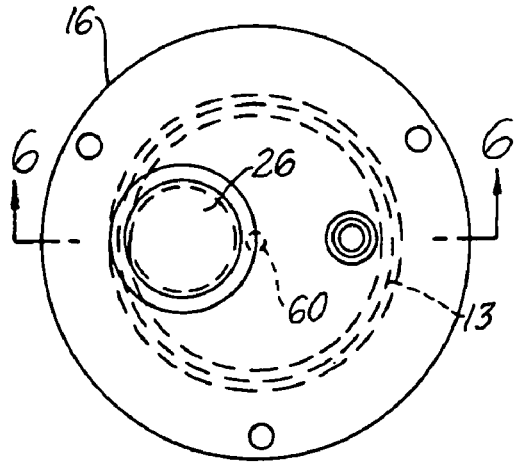
FIG. 5 is a plan view of the test fixture's cap, wherein elements such as a sight glass, fasteners and a bleeder valve have been removed.
Figure 6:
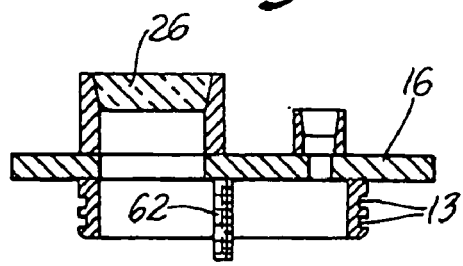
FIG. 6 is a sectional view taken along line 6—6 in FIG. 5.

Atop the upper end of housing section 12 is cap assembly 16 having conventional quick-release clamps 18, which secure the cap assembly to section 12. Clamps 18 have engagement members 20 passing through the assembly and through flange 22 of section 12. Moving handles 24 of the clamps to one position secures cap assembly 16 to flange 22, but moving the handles to another position allows assembly 16 to be removed from flange 22. Preferably, the handles are disposed radially inwardly of housing 12 and ring handle 9 as seen in FIG. 2. Cap assembly 16 also has a top sight glass 26 and an air bleeder valve 28. Assembly 16 has seal ring grooves 13 (FIG. 6) that accommodate conventional ring seals (not shown) so that it has a fluid-tight engagement with housing 12.

Figure 7:
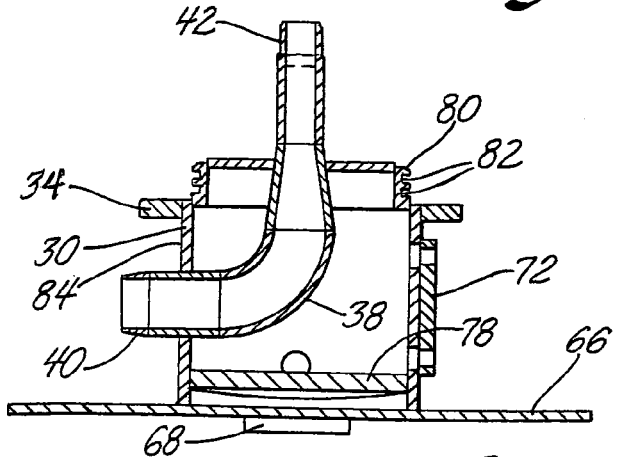
FIG. 7 is a sectional view taken along line 7—7 in FIG. 8.
Figure 10:
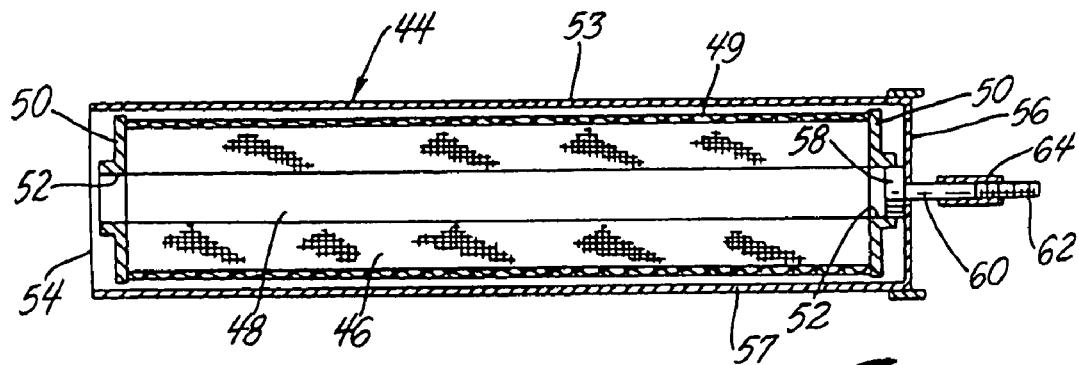
FIG. 10 is a sectional view of a conventional fuel filter used in conjunction with the test fixture.
Figure 11:
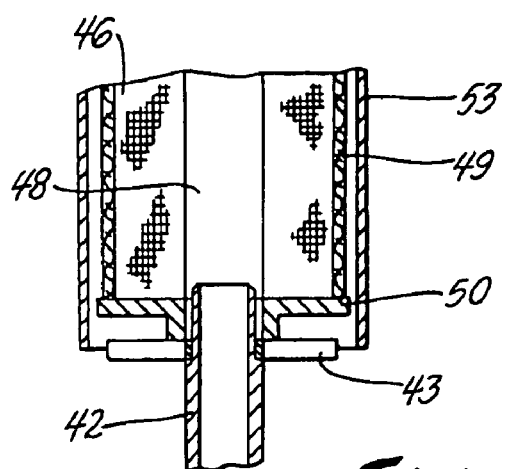
FIG. 11 is a sectional view showing details of engagement between a filter and the test fixture.
Figure 12:
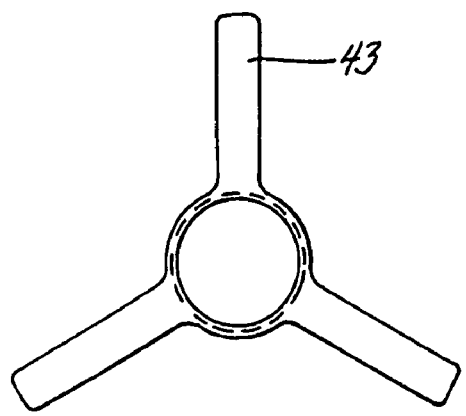
FIG. 12 shows an adapter used in the test fixture.

In FIGS. 1 and 7, housing section 12 mates with base section 30. The housing and base sections have respective flanges 32 and 34, where bolts, as at 36, fasten these sections together. Section 30 has an inlet conduit 38 having an entry end 40 extending externally therefrom and an inner end 42 protruding into section 12. Except for conduit 38, the top of base section 30 is unblocked, so fluid from housing section 12 freely flows into section 30. A removable adapter 43 mounted on end 42 supports the lower end of filter 44, typically by engaging terminus 50, as shown in FIG. 11. A plan view of the removable adapter is shown in FIG. 12. Any one of a number of shapes for removable adapter 43 may be utilized, depending on what configuration of filter is being used in fixture 10, whereby filters varying in length, diameter and terminus shape can be The manner in which filter 44 is engaged by fixture 10 and the manner in which filter 44 co-acts therewith are explained by reference to FIGS. 1 and 10. FIG. 10 is a conventional filter having an inner element 46 comprising a sheet of filtering medium folded to form closely spaced ribs radiating outward from an elongate central cavity 48. The outer peripheral surface of filter element 46 is covered by a fabric layer 49 and the zone's ends are covered by circular termini 50, whose short passageways 52 communicate with cavity 48. Surrounding element 46 is a canister 53 having an open end 54, a closed end 56 and a cylindrical wall 57 therebetween. Wall 57 is comprised of layers of screen and mesh material whose combined effect is to allow the passage of fuel but not the passage of water.

Boss 58 at closed end 56 fits into one of passageways 52 to locate filter element 46 within canister 53. As seen in both FIGS. 1 and 10, closed end 56 has a post 60 that is connected to a stake 62 by means of cylindrical adapter 64. Stake 62 is fixed to the inner surface of cap assembly 16, whereby the stake helps locate and fix filter 44 within test fixture 10. The adapter slidingly receives post 60 and thus can accommodate the post if it varies in length or varies in distance from cap assembly 16. Adapter 64 is threaded with stake 62 so that turning the adapter adjusts its axial position relative the stake. Hence, the adapter can accommodate an even larger range of post lengths and a greater range of distance between the post and cap assembly 16.

Figure 8:
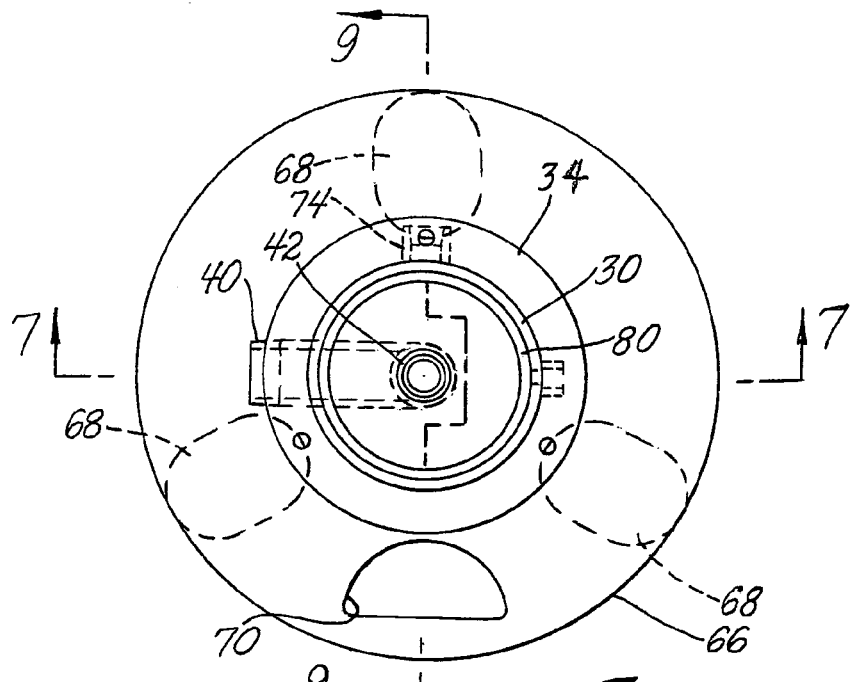
FIG. 8 is a plan view of the base section of the test fixture.
Figure 9:
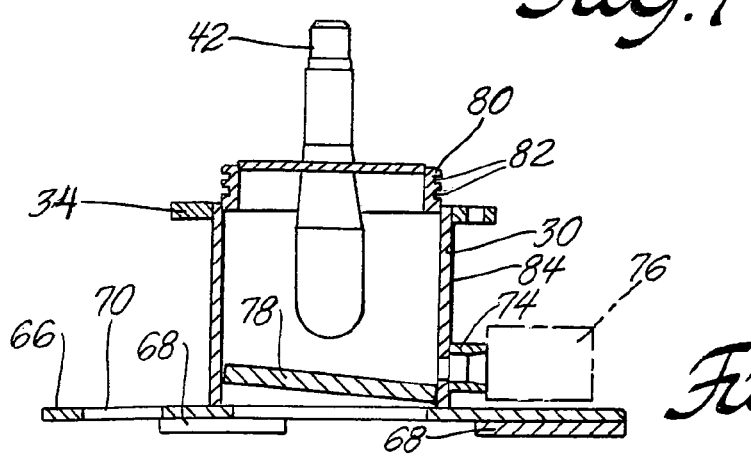
FIG. 9 is essentially a sectional view taken along line 9—9 in FIG. 8, but has a valve shown in notional fashion by dashed lines.

FIGS. 7, 8 and 9 show the structure of base section 30 of the test fixture. Section 30 rests on a base plate 66. Plate 66 cooperates with ring handle 9 to afford a degree of protection for handles 24, sight glasses 8 and sight glass 72. Base plate 66 and ring handle 9 extend radially outward from text fixture 10 farther than these elements and therefore prevents damage to them if fixture 10 tips over onto its side. Further in this eventuality, handles 24 are not disturbed and cap assembly 16 is not accidentally loosened from housing 12. Base plate 66 additionally has ground engagement pads 68 and defines a handgrip hole 70 that facilitates manual handling of fixture 10.

Section 30 is a reservoir for collecting water that separates from fuel in filter 44 and drains down from housing 12. Section 30 has a reservoir sight glass 72 for monitoring the water level and has an outlet or valve seat 74 through which water may be drained. A valve to control water flow from section 30 is represented by dashed lines at 76 in FIG. 9. Section 30 features a slightly concave inclined floor 78 having its lowest zone adjacent to outlet 74 to enhance water evacuation from section 30. A neck portion 80 of section 30 defines annular grooves 82 for accommodating ring seals (not shown) so that section 30 has a fluid-tight fit with housing 12. Preferably, conduit 38 is fixed only to the peripheral wail 84 of section 30 and is affixed thereto only at the immediate zone where the conduit enters section 30. This construction minimizes the use of elements that hinder the flow of water into base section 30.

In operation, when one wishes to change filter 44 in fixture 10, one merely moves handles 24 to the up, or "open," position and then lifts cap assembly 16 from hosing 12, whereupon the old filter is removed and replaced. Additionally, if the replacement filter is of a different configuration than the old one, then housing 12 is unbolted from base section 30 and lifted therefrom. Such lifting is facilitated by ring handle 9 and base plate 66. A human operator can place a foot on base plate 66 and lift on ring 9 so as to easily break the seal between housing 12 and base section 30 and lift the housing off the base section. Then the position of adapter 64 is adjusted as necessary and adapter 43 is replaced by a differently configured adapter if needed. The fact that filter 43 is positioned on conduit 38 external to base section 30 facilitates this adapter's removal and replacement. Thereafter the housing 12 is reattached to base section 30, the new filter is inserted into the fixture and cap assembly 16 is fastened to housing 12. Now fuel is pumped into test fixture 10 through entry end 40 of conduit 38, and this fuel passes through filter 44 and fills housing 12. An observer can monitor the filtration process by means of sight glasses 8 and can monitor water accumulation by means of sight glass 72. Air or vapor from the fuel may accumulate at the upper end of housing 12 during the filtering process, and one may wish to monitor the growth of the vapor or air body and bleed it off from time to time. This body may be observed through site glass 26. Stake 62 and adapter 64 are juxtaposed with sight glass 26 so that they can be seen therethrough. Hence, either stake 62 or adapter 64 can serve as a reference in roughly gauging the body's size and growth. When the body's size has increased to a given point, valve 24 may be opened until the body is evacuated sufficiently.

I do not desire to be limited to the exact details of construction or method shown herein since obvious modifications will occur to those skilled in the relevant arts without departing from the spirit and scope of the following claims.

The invention claimed is:

1. A filter fixture capable of holding filters of varied configurations, the fixture comprising:
   a base section having a first flange, and having a peripheral wall defining an open-topped reservoir space;
   an inlet conduit passing through the reservoir space;
   a first end of the conduit disposed above the base section;
   a second end of the conduit extending outward from the peripheral wall;
   a filter-supporting adapter removably attached to the first end of the conduit;
   a housing section having a second flange removably and sealingly mated to the first flange of the base section using bolts, the housing section enclosing the first end of the conduit and the filter-supporting adapter;
   an outlet conduit communicated to the housing;
   a cap removably mated to the housing;
   a repositionable filter-holding adapter connected to the cap; and
   means for facilitating manual removal of the housing section from the base section, the facilitating means comprising:
   a base plate on the base section extending radially outward therefrom on which the fixture rests, wherein the base plate additionally has ground engagement pads and the base plate defines a handgrip hole that facilitates manual handling of the fixture; and
   a ring handle on the housing section disposed radially outward thereof, wherein the ring handle has about the same diameter as the base plate and the base plate cooperates with the ring handle to prevent damage to the fixture and prevent the fixture from accidentally opening if the fixture is tipped over on its side.

2. The fixture of claim 1 wherein the filter has a filter post and the filter-holding adapter comprises:
   a stake on the cap; and
   an adapter element on the stake axially repositionable with respect to the stake, wherein the adapter element defines a cavity open toward the base section of the fixture, and the cavity is adapted to accept the filter post.

3. The fixture of claim 2 further comprising means on the cap for viewing the filter-holding adapter and any gaseous body formed there, whereby the filter-holding adapter serves as a reference to judge size of the gaseous body.

4. The fixture of claim 1 further comprising:
   a quick-release mechanism on the cap for fastening the cap to the housing section; and
   a handle of the quick-release mechanism disposed inwardly relative to the ring handle.

5. A fuel filter fixture capable of holding filters of varied configurations, the fixture comprising:
   a base section having a first flange;
   means for collecting water in the base section, the collecting means comprising a reservoir space defined by the base section;
   a peripheral wall surrounding the reservoir space;
   an inlet conduit passing through the reservoir space, the conduit fixed only to the peripheral wall;
   a first end of the conduit disposed above the base section;
   a second end of the conduit extending outward from the peripheral wall;
   a filter-supporting adapter removably attached to the first end of the conduit;

a housing section having a second flange removably and sealingly mated to the first flange of the base section using bolts, the housing section open toward the base section;

wherein the housing section encloses both the first end of the conduit and the filter-supporting adapter;

an outlet conduit communicated to the housing;

a cap removably and sealingly mated to the housing;

a repositionable filter-holding adapter connected to the inner surface of the cap;

a quick-release mechanism on the cap for fastening the cap to the housing section, wherein a handle of the quick-release mechanism is disposed radially inwardly relative to the housing section; and means for facilitating manual removal of the housing section from the base section, the facilitating means comprising:
   a base plate on the base section extending radially outward therefrom on which the fixture rests, wherein the base plate additionally has ground engagement pads and the base plate defines a hand-grip hole that facilitates manual handling of the fixture; and
   a ring handle on the housing section disposed radially outward thereof, wherein the ring handle has about the same diameter as the base plate and the base plate cooperates with the ring handle to prevent damage to the fixture and prevent the fixture from accidentally opening if the fixture is tipped over on its side.

* * * * *